United States Patent [19]

Inaga

[11] 3,735,939

[45] May 29, 1973

[54] TAPE CASSETTE

[75] Inventor: Katsu Inaga, Satagaya-ku, Tokyo, Japan

[73] Assignee: Sony Corporation, Tokyo, Japan

[22] Filed: Aug. 9, 1971

[21] Appl. No.: 170,214

[30] Foreign Application Priority Data

Aug. 10, 1970 Japan ................................45/79548

[52] U.S. Cl. .................242/198, 274/4 C, 274/11 C, 352/72

[51] Int. Cl.......G03b 1/04, G11b 15/32, G11b 23/04

[58] Field of Search ...............242/55.19 A, 197–200; 274/4 B, 4 C, 11 B, 11 C; 179/100.2 Z; 352/72–78

[56] References Cited

UNITED STATES PATENTS

| | | | |
|---|---|---|---|
| 3,617,013 | 11/1971 | Ainslie et al. | 242/197 |
| 3,547,373 | 12/1970 | Bundschuh | 242/197 |
| 3,451,636 | 6/1969 | Bunting | 242/197 |

*Primary Examiner*—Leonard D. Christian
*Attorney*—Lewis H. Eslinger, Alvin Sinderbrand and Curtis, Morris & Safford

[57] ABSTRACT

A tape cassette for magnetic tape apparatus for recording or reproducing or both and which has a housing formed by walls and in which one of the walls has formed therein a cutout and a slot contiguous thereto for engagement with one part of the apparatus to guide the tape cassette to a proper position of the apparatus.

7 Claims, 6 Drawing Figures

Patented May 29, 1973 3,735,939

5 Sheets-Sheet 1

INVENTOR
KATSU INAGA
BY Lewis H. Eslinger
ATTORNEY

Patented May 29, 1973 3,735,939

5 Sheets-Sheet 2

INVENTOR
KATSU INAGA
BY Lewis H. Eslinger
ATTORNEY

Patented May 29, 1973 3,735,939

5 Sheets-Sheet 3

INVENTOR
KATSU INAGA
BY Lewis H. Eslinger
ATTORNEY

INVENTOR
KATSU INAGA
BY Lewis H. Eslinger
ATTORNEY

INVENTOR
KATSU INAGA
BY
Lewis H. Eslinger
ATTORNEY

TAPE CASSETTE

BACKGROUND OF THE INVENTION

1. Field of the Invention

This invention relates generally to tape cassettes, and more particularly to tape cassettes adapted for easy and certain attachment to tape apparatus at a proper position thereof.

2. Description of the Prior Art

The use of tape cassettes is extending steadily in magnetic tape apparatus for recording and reproducing. Such apparatus will hereinafter be referred to simply as magnetic tape apparatus. There has recently been proposed cassette-type magnetic tape apparatus not only of the type employing a fixed magnetic head but also of the type using a rotary magnetic head as in the case of magnetic video tape apparatus. The tape cassette has merits such as protection of the tape and simplification of loading of the tape on the apparatus. In order to bring out such merits effectively, the tape cassette is required to be easily loaded in position on the magnetic tape apparatus without fail. This is especially true of magnetic tape apparatus for video use because the tape is drawn from the cassette and directed around a cylindrical drum incorporating a rotary magnetic head therein for helical scanning of the tape by the rotary magnetic head.

It is one object of this invention to provide a tape cassette which is arranged to be properly and surely attached to tape apparatus for use in cooperation therewith.

It is another object of this invention to provide a tape cassette having an improved housing to ensure attachment to magnetic tape apparatus.

Other objects, features and advantages of this invention will become apparent from the following description taken in conjunction with the accompanying drawings.

SUMMARY OF THE INVENTION

The tape cassette of the present invention has a housing provided with a cutout portion in at least one of walls thereof for engagement with one part of a magnetic tape apparatus to ensure attachment of the tape cassette to the apparatus at a proper position thereof. The tape cassette has a housing provided with a slot in the bottom wall thereof for engagement with one part of a magnetic apparatus to guide the cassette to a proper position of the apparatus to ensure correct attachment of the cassette.

DESCRIPTION OF THE PREFERRED EMBODIMENTS

Figure 1:
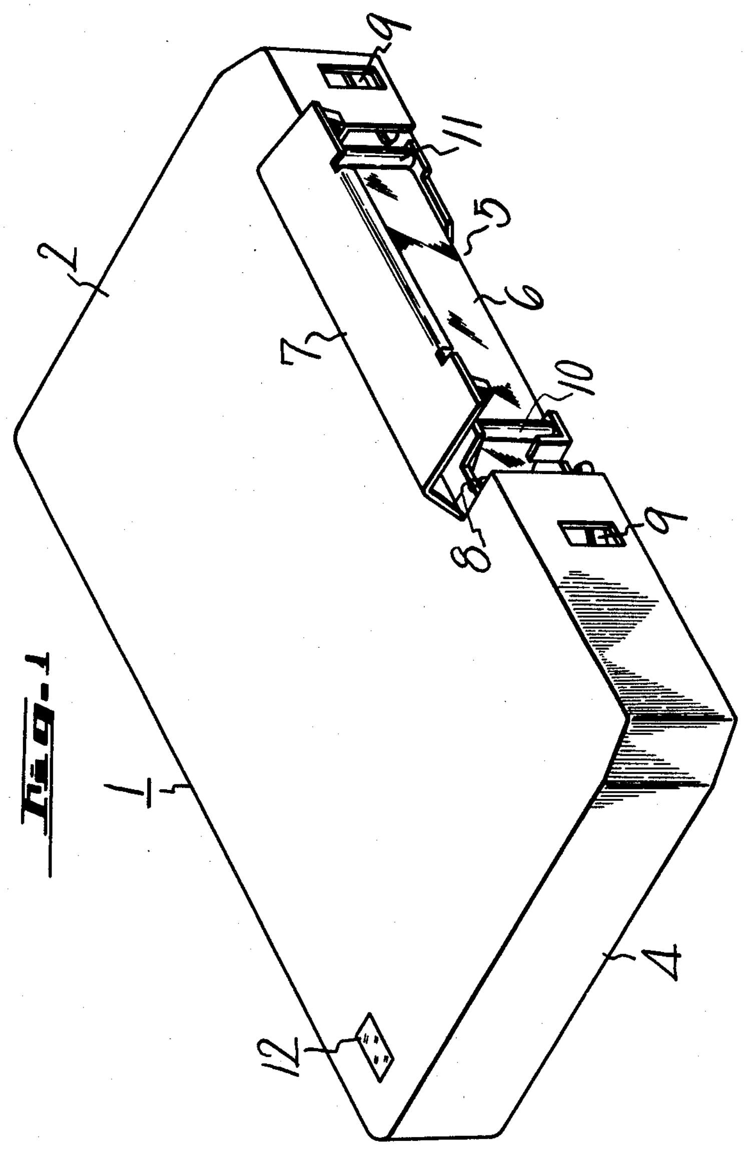
FIGS. 1 and 2 are perspective views showing one example of a tape cassette of this invention.
Figure 2:
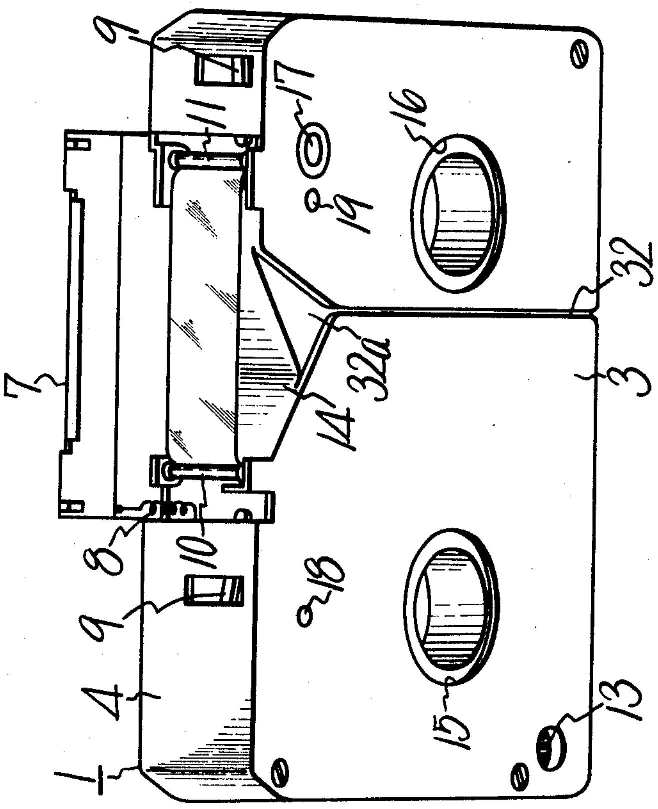
Figure 3:
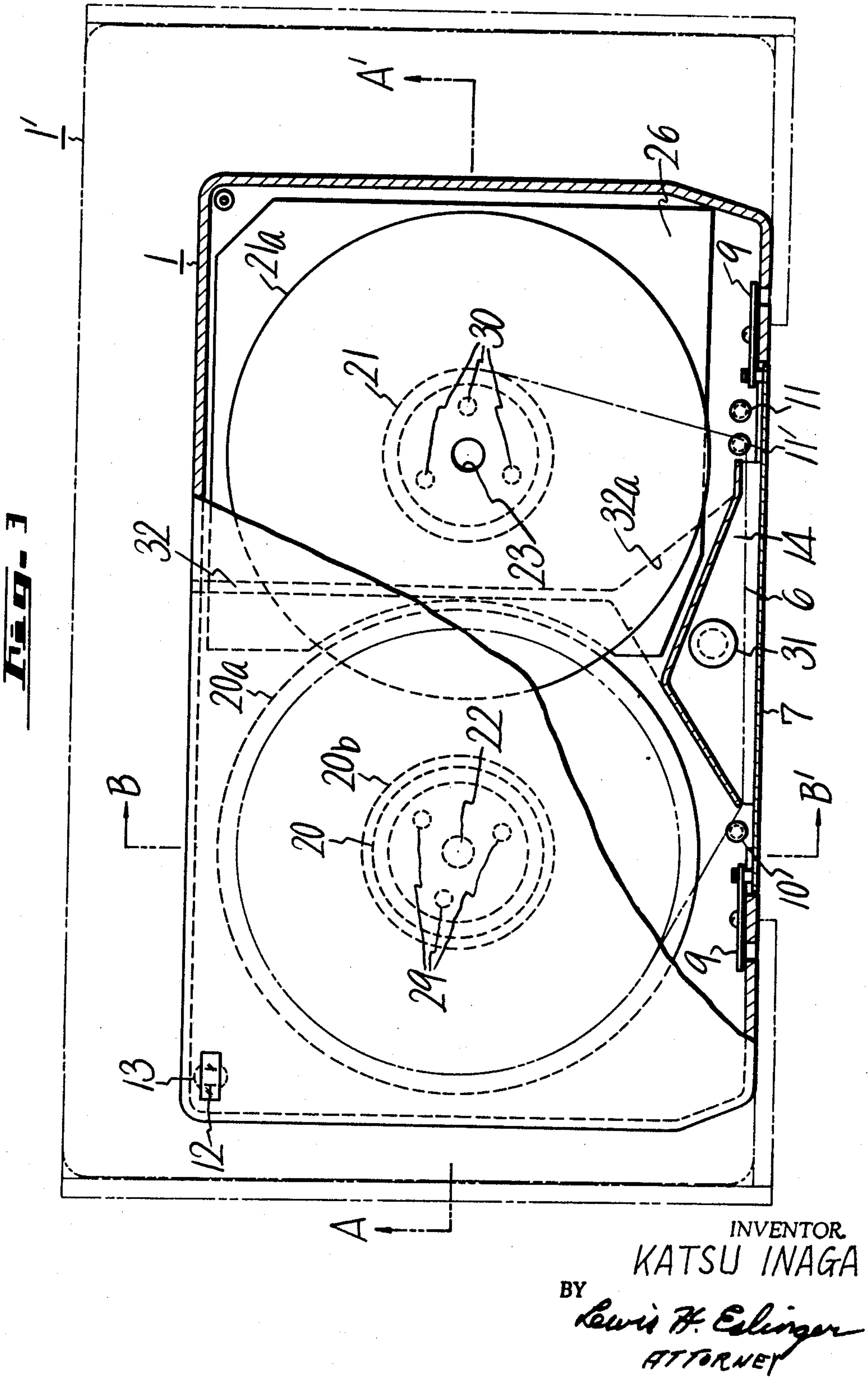
FIG. 3 is a plan view, partly in cross-section, showing the tape cassette exemplified in FIGS. 1 and 2.
Figure 4:
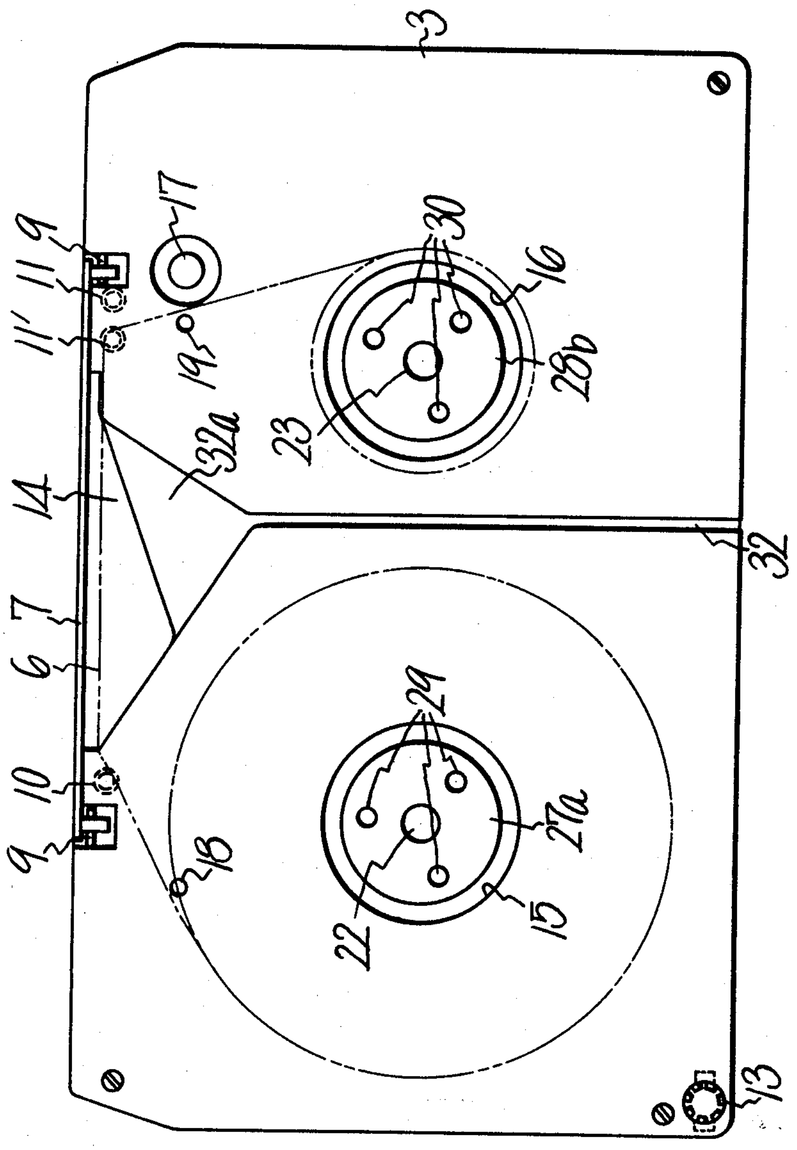
FIG. 4 is a bottom view of the tape cassette shown in FIGS. 1 and 2.

With reference to FIGS. 1 and 2, a description will be given first of the tape cassette of this invention as applied to magnetic tape apparatus for video signals. The cassette comprises a housing 1 that consists of substantially parallel top and bottom walls 2 and 3 and a side wall 4 connecting them with each other. The side wall 4 has an opening 5 therein for drawing out a magnetic tape 6 from the housing 1, and a lid 7 is provided for the opening 5. The lid 7 is biased by a spring 8 to cover the opening 5 normally and is locked by a locking means 9. Guide pins 10, 11, and 11' position the tape 6 and facilitate its travel when the tape 6 is drawn from the cassette and loaded on the apparatus. A display window 12 of a counter is provided for indicating the amount of the tape incorporated in the cassette and the number of uses of the cassette, or the like. An aperture 13 is provided for coupling the apparatus to drive the counter. While in use, the tape 6 is drawn from the housing 1 and loaded on a drum incorporating a rotary magnetic head therein, so that the bottom wall 3 has formed therein an opening 14 in which a tape extraction means, such as a pin provided in the apparatus for drawing out the tape 6 from the cassette, engages the tape 6. Further, the bottom wall 3 has apertures 15 and 16 to provide driving access for reels housed in the cassette. The wall 3 also includes means 17 to prevent accidental erasure and apertures 18 and 19 for fixing the position of the cassette when it is mounted on the apparatus.

Referring now to FIGS. 3 to 6, a pair of reels 20 and 21 having the magnetic tape 6 wound thereon are disposed in a predetermined spaced relation to each other in the cassette housing 1. As will be apparent from FIG. 5, th reels 20 and 21 have cavities 27 and 28 for receiving reel shafts of the apparatus and central apertures 22 and 23 formed in their upper end faces respectively, which apertures receive engaging shafts 24 and 25 projecting from the top wall 2 of the housing 1. The reels 20 and 21 are disposed in the housing 1 in a manner to be rotatable relative to the latter.

Figure 5:
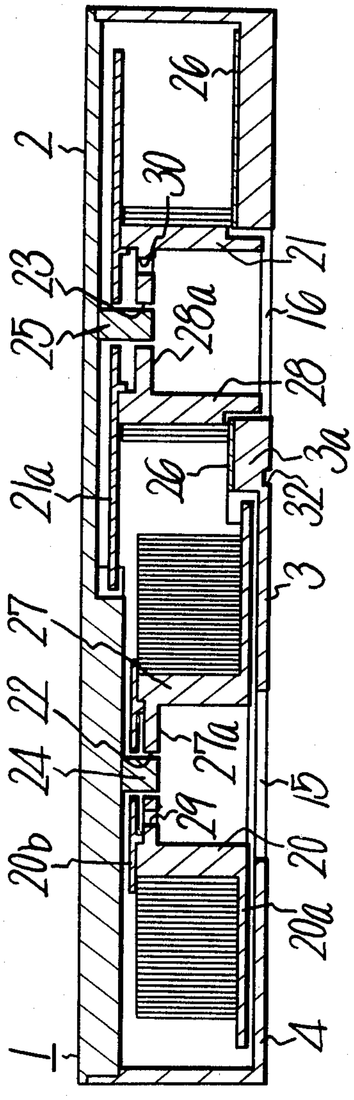
FIGS. 5 and 6 are cross-sectional views taken on the lines A–A' and B–B' in FIG. 3, respectively.
Figure 6:
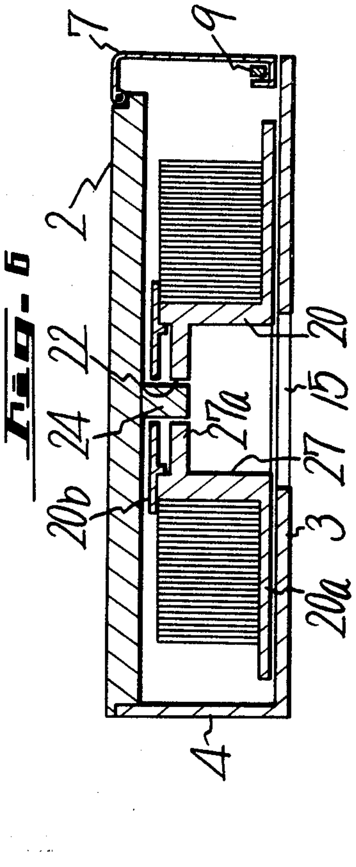

The supply reel 20 has a flange 20a of a large diameter formed at its lower end and a flange 20b of a small diameter at its upper end. The take-up reel 21 has a flange 21a only at the upper end thereof equal in diameter to the flange *20a* of the supply reel 20. The flange 21a overlies the flange *20a* when viewed from above. On the inside of the bottom wall 3 of the housing 1 a raised portion 3a is formed at a position corresponding to the take-up reel 21 and the raised portion *3a* is covered with a low-friction material 26 such as, for example, a Teflon sheet or the like to provide a flat surface, which serves as a lower flange of the take-up reel and facilitates smooth traveling of the tape. The cavities 27 and 28 of the reels 20 and 21 receive reel shafts of the apparatus which are inserted through the apertures 15 and 16 formed in the bottom wall 3 of the housing 1, and the reels 20 and 21 are driven by the reel shafts. Small apertures 28 and 29 are formed in the bottoms *27a* and *28a* of the cavities 27 and 28 to receive connecting pins projecting from the reel shafts in order to couple the reels with the reel shafts when the reel shafts are inserted into the cavities 27 and 28. In this case, it is preferred for stable driving of the reels that the bottoms *27a* and *28a* of the cavities 27 and 28 lie at a position more than 1/2 of the height of the reels as depicted in FIG. 5.

A tape guide pin 31 from the magnetic tape apparatus is inserted into the opening 14 formed in the bottom wall 3 of the cassette housing 1. The opening 5 is formed in the side wall 4 of the housing 1 corresponding to the opening 14 as previously described. The magnetic tape 6 wound on the supply reel 20 in the housing 1 is drawn out therefrom through the opening 5 across the guide pin 10, guided across the opening 14 along the front side wall of the housing 1 and then introduced again into the cassette housing 1 across the guide pins 11 and 11', thereafter being wound on the take-up reel 21.

When the magnetic tape apparatus is in its recording or reproducing condition, the magnetic tape 6 is drawn out by the tape guide pin 31 forwardly of the cassette housing 1 through the opening 5 and, at the same time, guided by the tape guide pins 10, 11, and 11' to be directed around a predetermined peripheral portion of a rotary magnetic head drum.

In the present invention, the bottom wall 3 of the cassette housing 1 has a slot 32 formed therein and extending from the front of the housing 1 in a direction in which the cassette is urged to slide when it is mounted on the cassette holder of the apparatus. The slot 32 is spread out at the front portion of the housing 1 to provide a substantially V-shaped cutout **32*a*. In this case, it is preferred that the cutout 32*a* is formed at a position corresponding to the opening 14 between the reels 20 and 21 in the housing 1 and that the cutout 32*a* at one end of the slot 32 is contiguous with the opening 14. Further, it is preferred that although the distance between the reels 20 and 21 varies with the size of the tape cassette used, the relationships between at least one of the reels, for example 20, the opening 14, and the slot 32 be held constant irrespective of the size of the tape cassette, for example, irrespective of the large size shown by a dot-dash line in FIG. 3. The slot 32 may be bottomless or it may be a groove and may be terminated at one end in the plane of the bottom wall 3**.

On the cassette receiving portion of the cassette holder of the apparatus which contacts the bottom wall 3 of the cassette housing 1, a projection is formed for engagement with slot 32 of the bottom wall 3 of the cassette housing 1 when the housing is in its correct loaded position. The cassette holder of the apparatus is designed so that the cassette housing 1, after being mounted on the cassette holder, is brought down onto the reel shafts to be engaged therewith. It is preferred that one of the reel shafts, for example the take-up reel shaft, be adapted to be moved in accordance with the size of the casstte housing employed. In this case, if the slot 32 is not formed at the center between the opposing side walls of the cassette housing 1 but at a position further to the right or left than the center, the slot 32 would not receive the projection of the apparatus to ensure avoidance of faulty loading of the cassette when the cassette is loaded in the wrong direction.

When the tape cassette of this invention is loaded in the cassette holder of the magnetic tape apparatus, the cassette is slid onto the cassette holder from the front of the apparatus, which allows the slot 32 formed on the bottom wall of the cassette housing to be engaged with the projection projecting from the cassette receiving portion of the cassette holder and to be guided to bring the tape cassette to a predetermined position on the cassette holder and retain the cassette thereon. In this case, even if the tape cassette is a little out ouf position to the right or left when it is loaded on the cassette holder, the V-shaped cutour 32a contiguous to the slot 32 always abuts with the projection of the cassette holder and guides it into engagement with the slot 32, thus ensuring that the tape cassette is loaded at the predetermined position. Accordingly, the tape cassette can be loaded on the apparatus by one hand without accurately ascertaining the position of the projection of the cassette holder.

As has been described in the foregoing, the present invention enables easy, accurate and rapid loading of tape cassettes of different sizes on the magnetic tape apparatus.

Although the present invention has been described as being applied to the tape cassette for video signal recording and reproducing apparatus, the invention is applicable to other tape cassettes for use with magnetic tape apparatus.

Further, in the foregoing the slot is formed in the bottom wall of the cassette housing; but when this invention is applied to tape cassettes different in height from the aforementioned cassette, the slot may be formed on the side walls of the cassette housing for facilitating the loading thereof.

It will be apparent that mmany modifications and variations may be effected without departing from the scope of the novel concepts of this invention.

What is claimed is:

1. A tape cassette for holding a tape and being used for supplying the tape to a tape apparatus for recording or reproducing or both, said cassette comprising:

A. A reel having said tape wound thereon; and

B. A housing formed by walls for containing said reel therein, said housing having an opening permitting the passage therethrough of said tape and one of said walls having a cutout formed at the peripheral portion thereof and a slot extending from said cutout for engagement with a portion of said apparatus during loading of said cassette to said apparatus thereby to guide said cassette to a predetermined position, said cutout involving a portion of the margin of said one wall and becoming gradually narrower toward said slot from said margin.

2. A tape cassette according to claim 1 in which said slot extends in the direction of movement of said cassette to be loaded to said apparatus.

3. A tape cassette according to claim 2 in which said cutout is substantially delta-shaped, one side of said delta-shaped cutout being at said margin and one apex opposing to said one side being contiguous to said slot.

4. A tape cassette for holding a tape and being used for supplying the tape to tape apparatus for recording or reproducing or both, said cassette comprising:

A. A reel having said tape wound thereon; and

B. A housing formed by walls for containing said reel therein, said housing having an opening permitting the passage therethrough of said tape and one of said walls having a cutout formed at a peripheral portion thereof and a slot extending from said cutout for engagement with a portion of said apparatus during loading of said cassette to sad apparatus, thereby to guide said cassette to a predetermined position, and in which said walls of the housing are constituted by top, bottom and side walls, said opening is located in said side wall and said cutout and slot are formed in said bottom wall.

5. A tape cassette according to claim 4 in which said cutout and slot extend across said bottom wall to one edge thereof from the opposing edge.

6. A tape cassette according to claim 4 in which said housing contains a supply reel and a take-up reel spaced from each other on the inside of said bottom wall and said slot is provided between said supply and take-up reels.

7. A tape cassette according to claim 6 in which said slot is spaced by a predetermined distance from one of said supply and take-up reels regardless of the size of said cassette.

* * * * *